United States Patent
Siravara et al.

(10) Patent No.: US 8,832,708 B2
(45) Date of Patent: Sep. 9, 2014

(54) PROCESS POOL OF EMPTY APPLICATION HOSTS TO IMPROVE USER PERCEIVED LAUNCH TIME OF APPLICATIONS

(75) Inventors: Bharath Siravara, Issaquah, WA (US); Neil A. Brench, Redmond, WA (US); Arthur William James Freeman, Kirkland, WA (US); Mark H. Krueger, Tucson, AZ (US); David R. Anderson, Saratoga, CA (US); Joerg Raymond Brown, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 297 days.

(21) Appl. No.: 12/902,318

(22) Filed: Oct. 12, 2010

(65) Prior Publication Data

US 2012/0089986 A1   Apr. 12, 2012

(51) Int. Cl.
*G06F 9/52* (2006.01)

(52) U.S. Cl.
USPC .......................................... 718/104; 718/100

(58) Field of Classification Search
None
See application file for complete search history.

(56) References Cited

U.S. PATENT DOCUMENTS

| | | | |
|---|---|---|---|
| 5,696,975 A | 12/1997 | Moore et al. | |
| 6,202,121 B1 | 3/2001 | Walsh et al. | |
| 7,076,616 B2 * | 7/2006 | Nguyen et al. | 711/156 |
| 7,689,979 B1 | 3/2010 | Sawyer et al. | |
| 2002/0069236 A1 * | 6/2002 | Jahnke | 709/104 |
| 2004/0030882 A1 | 2/2004 | Forman | |
| 2004/0226016 A1 * | 11/2004 | Sreejith | 718/104 |
| 2005/0193380 A1 * | 9/2005 | Vitanov et al. | 717/143 |
| 2008/0163246 A1 | 7/2008 | Jogand-Coulomb et al. | |
| 2011/0313966 A1 * | 12/2011 | Schmidt et al. | 706/52 |

OTHER PUBLICATIONS

Goetz, Brian, "Java theory and practice: Thread pools and work queues", Retrieved at << http://www.ibm.com/developerworks/library/j-jtp0730.html >>, Jul. 1, 2002, pp. 7.

"Application Fundamentals", Retrieved at << http://developer.android.com/guide/topics/fundamentals.html >>, Jul. 21, 2010, pp. 20.

Wilson, Jim, "Microsoft .Net Compact Framework Background Processing Techniques", Retrieved at << http://msdn.microsoft.com/en-us/library/aa446488.aspx >>, Mar. 2003, pp. 8.

* cited by examiner

*Primary Examiner* — Kenneth Tang
(74) *Attorney, Agent, or Firm* — Sung Kim; Andrew Sanders; Micky Minhas

(57) ABSTRACT

Various embodiments enable a device to create a pool of at least one empty application. An empty application can be configured to contain resources that are common across one or more other applications and initialize the resources for the one or more other applications effective to reduce startup time of the other applications. In one or more embodiments, an empty application can further be populated with the one or more other applications effective to cause the one or more other applications to execute. Alternately or additionally, a device can be monitored for an idle state, and, upon determining the device is in the idle state, at least one empty application can be created.

20 Claims, 6 Drawing Sheets

PROCESS POOL OF EMPTY APPLICATION HOSTS TO IMPROVE USER PERCEIVED LAUNCH TIME OF APPLICATIONS

BACKGROUND

As devices advance with technology, so do applications which the devices run. Many advanced applications executed on a device utilize software components, resources, and architectures which can utilize a substantial amount of initialization time. One unit of measure used to evaluate a device is how quickly a user can launch and access an application on the device. With limited central processing unit (CPU) capabilities as well as limitations of other resources utilized for the purpose of application startup on some devices, launching an application can become a performance issue.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable a device to create a pool of at least one empty application. An empty application can be configured to contain resources that are common across one or more other applications and initialize the resources for the one or more other applications effective to reduce startup time of the other applications. In one or more embodiments, an empty application can further be populated with the one or more other applications effective to cause the one or more other applications to execute. Alternately or additionally, a device can be monitored for an idle state, and, upon determining the device is in the idle state, at least one empty application can be created.

BRIEF DESCRIPTION OF THE DRAWINGS

The same numbers are used throughout the drawings to reference like features.

DETAILED DESCRIPTION

Overview

Various embodiments enable a device to create a pool of at least one empty application. An empty application can be configured to contain resources that are common across one or more other applications and initialize the resources for one of the other applications effective to reduce startup time of the other applications. For example, as an empty application is created, at least one software component that is common across one or more other applications can be instantiated, loaded, and/or initialized by the empty application. In some embodiments, when one of the other applications is selected to run, the empty application can be further populated with the other application effective to cause the other application to execute, such as by inhabiting the process or other application domain created by or for the empty application. Alternately or additionally, the software component(s) initialized by the empty application become available to one or more of the other applications for use.

In one or more embodiments, a device can be monitored for an idle state. For example, a timer can be used to look for and ascertain when the device is not in active use. Upon determining the device is in the idle state, at least one empty application can be created, thus shifting overhead processing impact of application creation to a time when the device is determined to be less active.

In the discussion that follows, a section entitled "Example Operating Environment" is provided and describes one operating environment in which one or more embodiments can be employed. Following this, a section entitled "Example Implementation" describes how a device can create empty applications and initialize resources within the empty application effective to reduce startup time of one or more other applications. Next, a section entitled "Generating Empty Applications when Idle" describes how a device's state can be monitored for an idle state and, responsive to determining an idle state, one or more empty applications can be generated. Last, a section entitled "Example System" describes an example system that can be used to implement one or more embodiments.

Consider now an example operating environment in which one or more embodiments can be implemented.

Example Operating Environment

Figure 1:
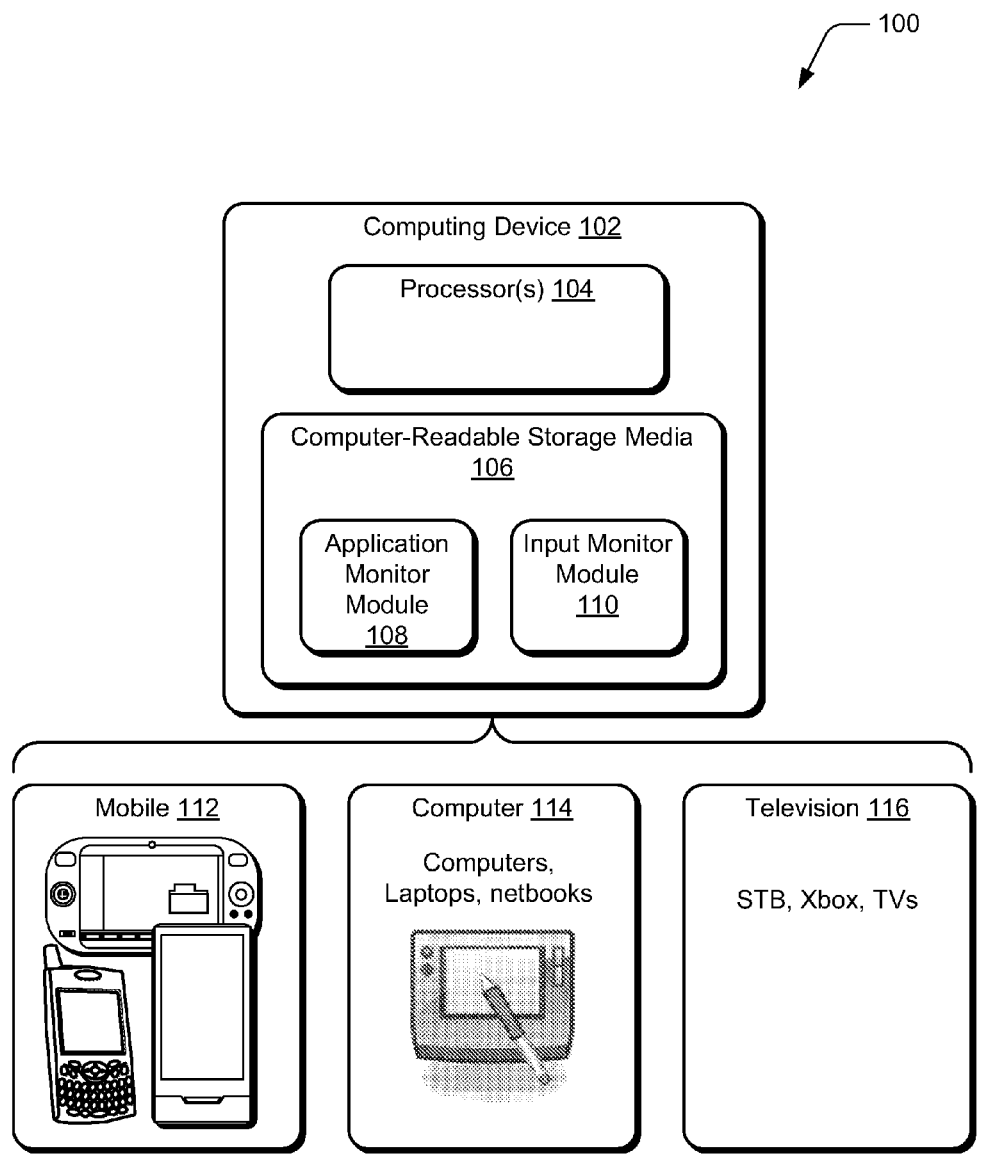
FIG. 1 is an illustration of an environment in an example implementation in accordance with one or more embodiments.

FIG. 1 illustrates an example operating environment in which a process pool of empty applications can be employed in accordance with one or more embodiments. A process pool can contain one or more empty applications. Individual empty applications can contain one or more resources that are common across one or more other applications. When an empty application is created, the associated resources can be instantiated, loaded, and/or otherwise initialized, such that when another application is selected to execute, the selected application can populate the empty application and utilize the initialized common resources. Consequently, by using the initialized common resources, the start time associated with the selected application is perceived to be reduced.

Illustrated environment 100 includes computing device 102 having one or more processors 104 and one or more computer-readable storage media 106 that may be configured in a variety of ways. In one or more embodiments, computer-readable storage media 106 can include an application monitor module 108 and an input monitor module 110 that operate as described above and below. The computing device 102 may assume a mobile device class 112 which includes mobile telephones, music players, PDAs, digital media players, handheld gaming systems, and so on. The computing device 102 may also assume a computer device class 114 that includes personal computers, laptop computers, netbooks, and so on. The computing device 102 may also assume a television device class 116 that includes configurations of devices that involve display in a casual environment, e.g., televisions, set-top boxes, game consoles, and so on. Thus, the techniques described herein may be supported by these various configurations of the computing device 102 and are not limited to the specific examples described in the following sections. The computing device 102 also includes software that causes the computing device 102 to perform one or more operations as described below.

The application monitor module 108 and input monitor module 110 can be implemented in connection with any suitable type of hardware, software, firmware or combination thereof. In at least some embodiments, the application monitor and input monitor modules are implemented in software that resides on some type of tangible, computer-readable storage medium. The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

Application monitor module 108 is representative of functionality that manages creation of a pool of one or more empty applications, as well as population of an empty application with another application, which is further described below. In one or more embodiments, the application monitor module can defer creation of empty applications to a time when the computing device is less engaged or idle. Input monitor module 110 is representative of functionality that monitors device activity and signals to one or more recipients when a device is determined to be less engaged or idle. In one or more embodiments, input monitor module 110 can notify application monitor module 108 of a device's state which, in turn, can enable the application monitor module to create at least one empty application during the device's inactive period.

Having described an example operating environment, consider now a discussion of how at least one empty application can be created and populated with at least one other application, in accordance with one or more embodiments.

Example Implementation

Various embodiments enable a device to create a pool of one or more empty applications in anticipation of populating the empty applications with specific-type applications when directed, such as when a user selects and launches a specific-type application. An empty application, in at least some embodiments, contains at least one resource that is common across one or more other applications and is primarily directed towards resource initialization. Any resource can be included in, or otherwise associated with an empty application such as, by way of example and not limitation, user interface (UI) components, web application frameworks, system infrastructure, Common Language Runtime, system libraries, third-party libraries, hardware-related resources, network connections, and the like. When an empty application is created, the associated resources can be loaded, instantiated and/or initialized. As such, an empty application can be considered, in a sense, to be a placeholder for applications that are directed to more specific purposes. In one embodiment, when a specific-type application is selected to run, an associated empty application can be populated with the specific-type application such that the specific-type application can utilize resources initialized by the empty application.

Figure 2:
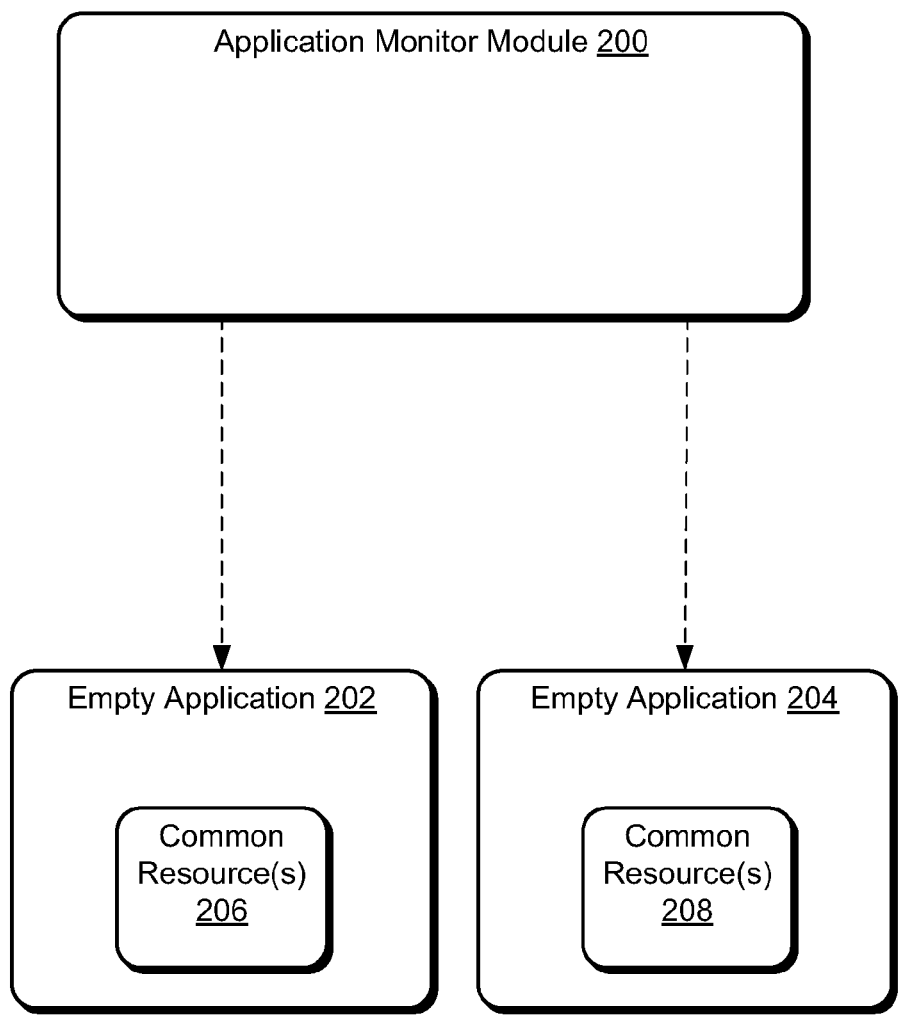
FIG. 2 illustrates an example implementation in operation in accordance with one or more embodiments.

As an example, consider FIG. 2, which illustrates an application monitor module 200 governing creation of one or more empty applications. In some embodiments, the application monitor can be the sole entity governing the size and preparedness of the empty application pool. In this particular example, application monitor module 200 creates two empty applications—empty application 202 and empty application 204. It is to be appreciated and understood, however, that any number of empty applications can be created and/or managed by the application monitor module without departing from the spirit of the claimed subject matter. In one embodiment, application monitor module 200 creates the empty application(s) to add and manage in a pool of empty applications. In another embodiment, application monitor module 200 can receive notification of newly created empty applications to add and manage in the pool.

In the illustrated and described embodiment, empty application 202 contains common resources 206, while empty application 204 contains common resources 208. As part of the creation process, each empty application can load, instantiate, and/or otherwise initialize corresponding common resources that are common across multiple applications or classes of applications. In one embodiment, common resources 206, 208 can contain the same common resources, or instances of the same common resources. In another embodiment, common resources 206, 208 can contain some of the same resources/instances of the same resources or none of the same resources. For example, there can be a variety of definitions and/or versions of common resource(s) which can be used to instruct what common resource(s) an empty application initializes. Once an empty application is created, the empty application can then wait for further instructions, such as instructions to load a more specific-type application assembly directed towards purposes beyond common resource initialization.

In some embodiments, application monitor module 200 can populate an empty application with a more specific-type application. Populating an empty application can include, by way of example and not limitation, loading the empty application and associated resources with a more specific-type application. For example, in one embodiment, a Uniform Resource Identifier (URI) can be passed into the empty application. The URI contains information used to load and execute a more specific-type application. It is to be appreciated and understood that alternate methods of notifying and/or loading an empty application with a more specific-type application to run can be used without departing from the scope of the claimed subject matter. Since common resources were previously loaded, instantiated and/or otherwise initialized by the empty application, the specific-type application can initialize the resources it specifically utilizes that have not already been loaded, instantiated and/or otherwise initialized. Thus, the perceived start time of the specific-type application can be reduced by that which would have be utilized to load, instantiate and/or otherwise initialize the resources previously processed by the empty application.

Figure 3:
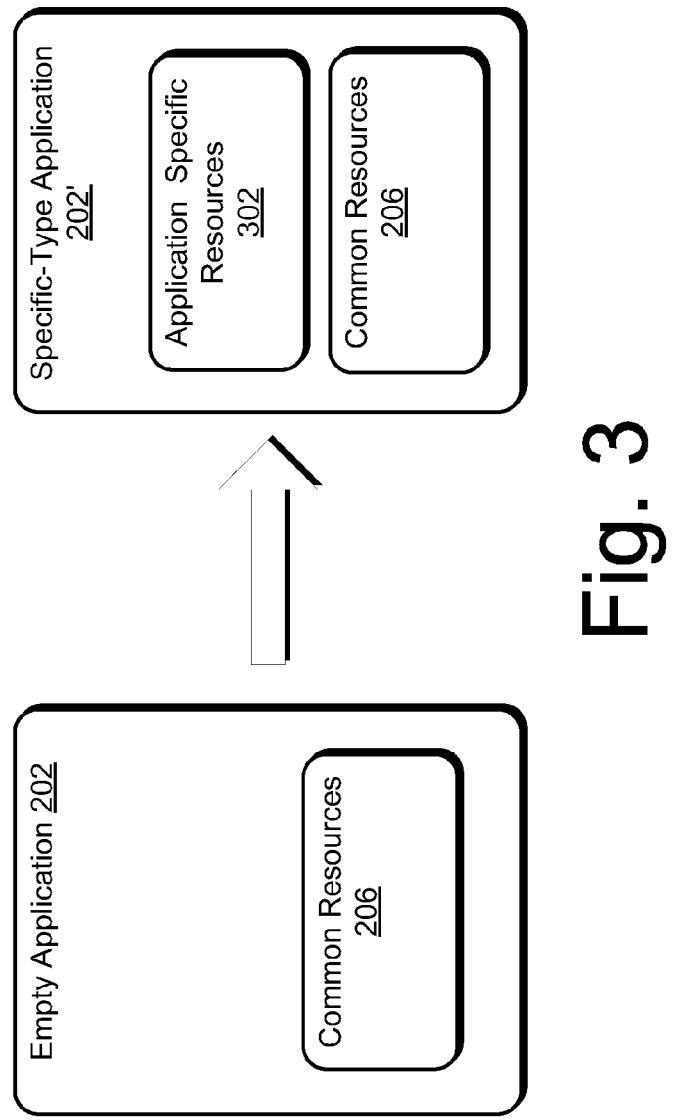
FIG. 3 is an example implementation in operation in accordance with one or more embodiments.

FIG. 3 illustrates population of an empty application with a specific-type application in accordance with one or more embodiments. As described above, empty application 202 contains or otherwise is associated with common resources 206. In some embodiments, a user can select, via one or more input mechanisms, a specific-type application to run. User input can be received through any input mechanism such as, by way of example and not limitation, through a keyboard input, a touch screen, a mouse click, a stylus, and the like. Responsive to receiving selection of a specific-type application via an input mechanism, an empty application can be populated with the specific-type application effective to cause the specific-type application to execute. For example, FIG. 3 illustrates specific-type application 202', which utilizes the same process as that of empty application 202, as well as the same common resources 206, which were instantiated, loaded and/or initialized when empty application 202 was created. Additionally, specific-type application 202' includes application specific resources 302, which represents any application specific code, software components, assemblies, infrastructure, and the like, that are utilized by the specific-type application and are not included in the common resources 206.

Figure 4:
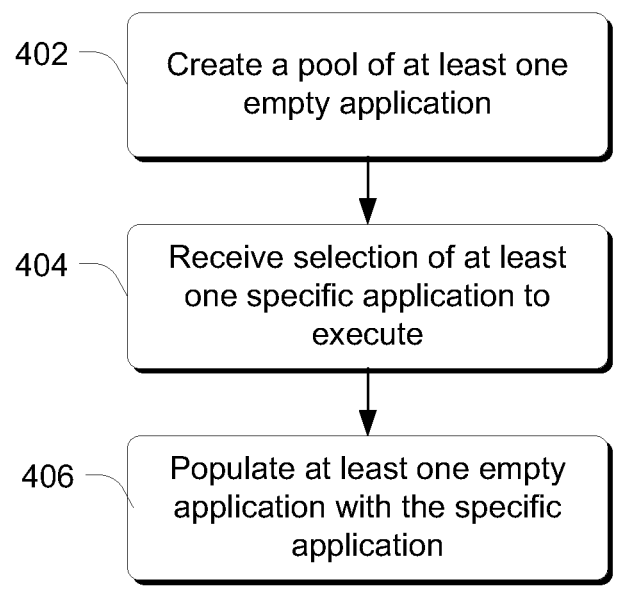
FIG. 4 is a flow diagram that describes steps in a method in accordance with one or more embodiments.

FIG. 4 is a flow diagram that describes steps in a method in accordance with one or more embodiments. The method can be implemented in connection with any suitable hardware, software, firmware or combination thereof. In at least some embodiments, aspects of the method can be implemented by a suitably configured software module, such as application monitor module 108 and/or input monitor module 110.

Step 402 creates a pool of at least one empty application. Any number of empty applications can be created and maintained in the pool. Step 404 receives selection of at least one specific-type application to execute. Receiving selection of at least one specific-type application can be accomplished through a variety of input mechanisms, examples of which are provided above. Step 406 populates at least one of the empty applications in the pool with the specific-type application such that the specific-type application executes, such as, by way of example and not limitation, executing in the empty application space and utilizing common resources initialized by the empty application.

Having described how a pool of empty applications can be created and populated with a more specific-type application, consider now a discussion of how an empty application can be generated during a device's idle period in accordance with one or more embodiments.

Generating Empty Applications when Idle

Various embodiments provide an ability to monitor a device for an idle state, or a state of device inactivity. By monitoring the device for an idle state, empty application creation can be deferred to a time when the CPU, potentially in combination with other hardware resources, is not being actively engaged or is being utilized to a lesser degree. For example, empty applications instantiate, load and/or initialize one or more resources, which can consume CPU time. Waiting for an idle state creates an empty application during a period of low CPU-usage and during a time that is less likely to impact the user or be perceived by a user as a device slowdown.

In at least one embodiment, a device's activity can be measured through the use of a timer. For example, a timer can be set for a predetermined expiration time and the device can be monitored for inputs. When input to the device is detected, the timer can be reset, which restarts the timer's expiration time. If a user is actively interacting with the device, the timer will continuously be reset, thus preventing the timer from expiring. User input can be captured via various input mechanisms, examples of which are provided above. When the timer expires, an event can be signaled to indicate lack of input or device activity. In some embodiments, the event can include, by way of example and not limitation, a broadcast message sent to modules subscribed to the event, a message or event directed to one or more particular modules, and/or a message or event sent to any module resident in the system, to name just a few. For example, application monitor module 108 can subscribe to such events. Upon determining the device is idle, an event can be sent to the application monitor module and, responsively, an empty application can be created. Alternately or additionally to an empty application, a specific-type application that has been deemed as a high usage application can be launched partially or fully during periods of inactivity. A high usage application can be determined in any suitable way, such as through statistics or based upon learned user behavior patterns. By monitoring a device for periods of inactivity, time-intensive operations can be executed during times less likely to impact the user.

Figure 5:
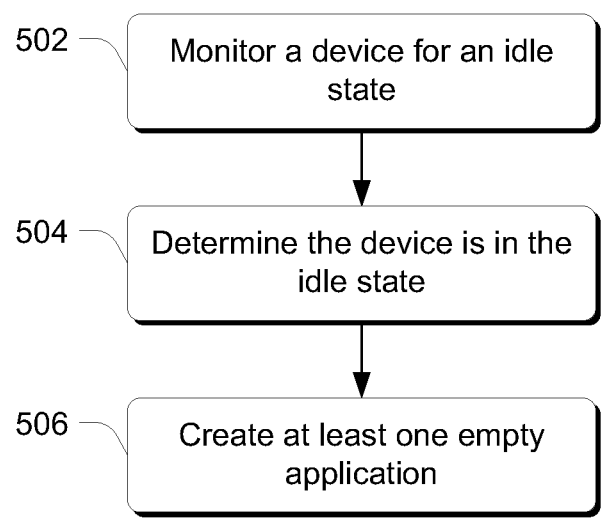
FIG. 5 is a flow diagram that describes steps in a method in accordance with one or more embodiments.

FIG. 5 is a flow diagram that describes steps in a method in accordance with one or more embodiments. The method can be implemented in connection with any suitable hardware, software, firmware or combination thereof. In at least some embodiments, aspects of the method can be implemented by a suitably configured software module, such as input monitor module 110 and/or application monitor module 108.

Step 502 monitors a device for an idle state. This step can be performed in any suitable way. For example, in one embodiment, an input monitor module can monitor the device for user input over a period of time. Step 504 determines the device is in the idle state. A device's idle state can be determined in any suitable way, examples of which are provided above. Responsive to determining the device is idle, step 506 creates at least one empty application. For example, in some embodiments, upon receiving a notification from the input monitor module, an application monitor module can create, or initiate the creation of the empty application(s). Alternately or additionally, a high-usage specific-type application can be partially or fully launched when the device is determined to be idle, as noted above.

Having described various embodiments of empty application generation, consider now an example system that can be utilized to implement one or more of the above-described embodiments.

Example System

Figure 6:
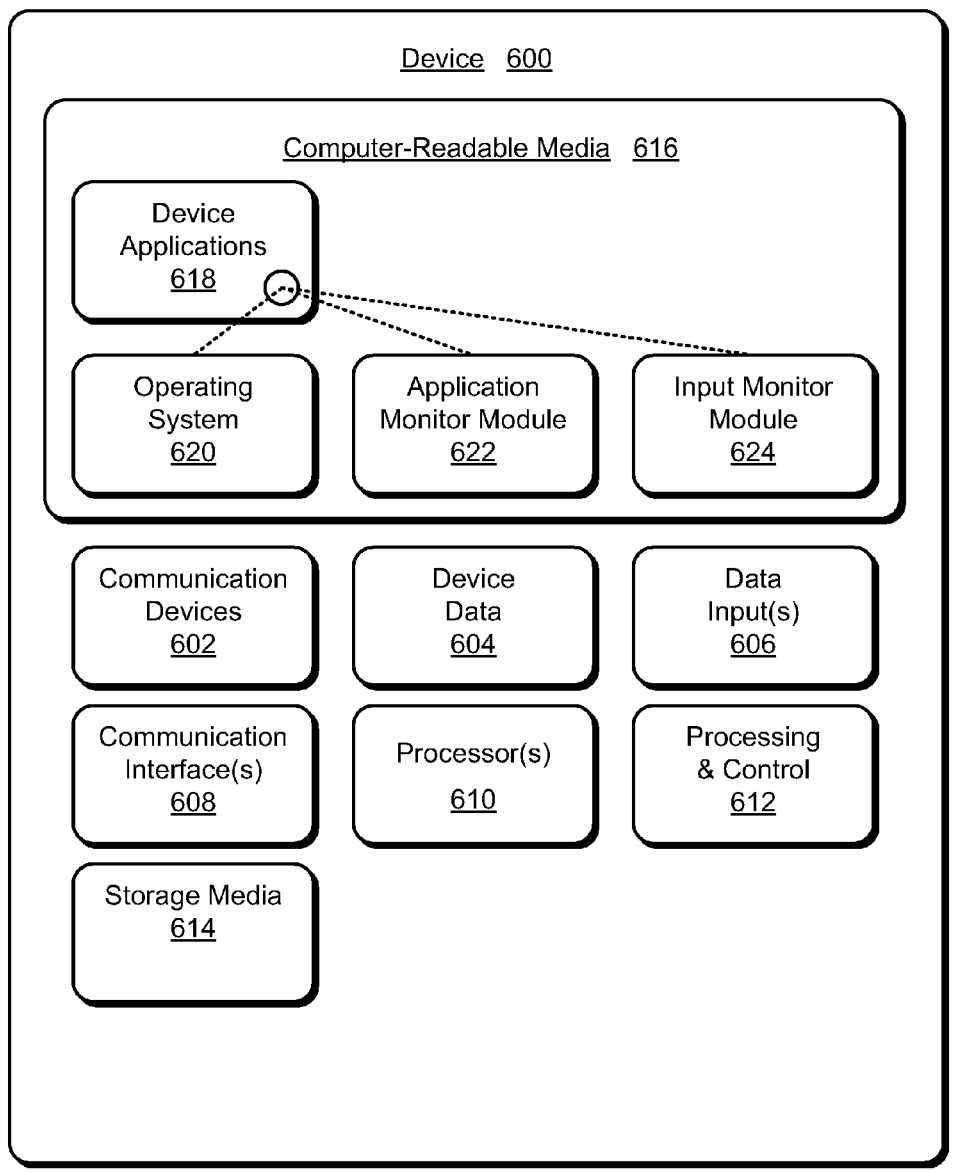
FIG. 6 illustrates an example system that can be used to implement one or more embodiments.

FIG. 6 illustrates various components of an example device 600 that can be implemented as any type of portable and/or computer device as described with reference to FIG. 1 to implement embodiments of creating a process pool of empty applications described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source. User-selectable inputs include one or more input mechanisms by which a user can interact with the device. A user-selectable input mechanism can be implemented in any suitable way, such as a keyboard, a button, a stylus, a touch screen, a mouse, voice input, and the like.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable or readable instructions to control the operation of device 600 and to implement creating of a pool of empty applications as described above. Alternatively or in addition, device 600 can be implemented with any one or combination of hardware, firmware, or fixed logic circuitry that is implemented in connection with processing and control circuits which are generally identified at 612.

Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable storage media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like.

Computer-readable media 616 provides data storage mechanisms to store the device data 604, as well as various device applications 618 and any other types of information and/or data related to operational aspects of device 600. For example, an operating system 620 can be maintained as a computer application with the computer-readable media 616 and executed on processor(s) 610. The device applications 618 can include a device manager (e.g., a control application, software application, signal processing and control module, code that is native to a particular device, a hardware abstraction layer for a particular device, etc.). The device applications 618 also include any system components or modules to implement embodiments of creating a pool of empty applications as described herein. In this example, the device applications 618 include an application monitor module 622 and an input monitor 624 that are shown as software modules and/or computer applications. The application monitor module 622 is representative of software that is configured to monitor and manage a pool of empty applications. Input monitor module 624 is representative of software that can monitor inputs and determine when the device is not being actively engaged. Alternatively or in addition, the application monitor module 622 and the input monitor module 624 can be implemented as hardware, software, firmware, or any combination thereof.

CONCLUSION

Various embodiments enable a device to create a pool of at least one empty application. An empty application can be configured to contain resources that are common across one or more other applications and initialize the resources for the one or more other applications effective to reduce startup time of the other applications. In one or more embodiments, an empty application can further be populated with the one or more other applications effective to cause the one or more other applications to execute. Alternately or additionally, a device can be monitored for an idle state, and, upon determining the device is in the idle state, at least one empty application can be created.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
one or more processors
one or more computer-readable memories storing computer-executable instructions that are executable by the one or more processors to perform operations comprising:
creating a pool of at least one empty application, each empty application of the at least one empty application configured as a placeholder for a specific-type application, and further configured to:
include resources that are common across one or more other applications; and
be empty of application-specific resources;
initializing the resources that are common across one or more specific-type applications for one of the one or more specific-type applications during creation of each empty application of the pool of at least one empty application effective to reduce startup time of said one of the one or more specific-type applications;
receiving input via one or more input mechanism effective to select one of the one or more specific-type applications, wherein the one or more specific-type applications have a specific-purpose beyond initializing the resources that are common across one or more other applications; and
responsive to receiving the input, populating the at least one empty application with the selected one of the one or more specific-type applications effective to enable execution of the selected one of the one or more specific-type applications.

2. The computing device of claim 1, wherein the instructions to populate the at least one empty application with the selected one of the one or more specific-type applications further are further executable to perform operations comprising loading an assembly of the one or more specific-type applications in the at least one empty application.

3. The computing device of claim 2, wherein the instructions to load an assembly of the one or more specific-type applications are further executable to perform operations comprising loading the assembly based, at least in part, on a Uniform Resource Identifier (URI).

4. The computing device of claim 1, wherein the pool of at least one empty application comprises at least two empty applications and each empty application includes instances of resources that are the same resources.

5. The computing device of claim 1, wherein the resources that are common across one or more other applications include user interface (UI) components.

6. The computing device of claim 1, wherein the computer-executable instructions are further executable to perform operations comprising:
monitoring a device's activity;
determining whether the device is idle based, at least in part, on the monitored activity; and
responsive to determining the device is idle, sending a notification of said device being idle effective to create at least one empty application of the pool of at least one empty applications.

7. A device comprising:
one or more processors;
one or more input mechanisms;
one or more computer-readable memory storage devices;
an application manager module embodied on the one or more computer-readable storage memory, the application module being configured to implement a method, under the influence of the one or more processors, the method comprising:

creating a pool of at least one empty application, each empty application of the at least one empty application configured as a placeholder for a specific-type application, and further configured to include resources that are common across one or more specific-type applications, wherein creating the pool of the at least one empty application comprises initializing the resources that are common across the one or more specific-type applications for the one or more specific-type applications;

receiving input via the one or more input mechanisms effective to select one of the one or more specific-type applications; and responsive to receiving the input, populating the at least one empty application with a selected one of the one or more specific-type applications effective to enable execution of the selected one of the one or more specific-type applications, wherein populating the at least one empty application comprises:

loading an assembly associated with the selected one of the one or more specific-type applications into the at least one empty application;

loading one or more application-specific resources associated with the selected specific-type application into the at least one empty application; and initializing at least one of the one or more application-specific resources in the at least one empty application.

8. The device of claim 7, wherein the device is a mobile device.

9. The device of claim 7, wherein loading an assembly of the one or more specific-type applications further comprises loading the assembly based, at least in part, on a Uniform Resource Identifier (URI).

10. The device of claim 7, wherein the pool of at least one empty application comprises at least two empty applications and each empty application includes instances of resources that are the same resources.

11. The device of claim 7, wherein the resources that are common across one or more specific-type applications include user interface (UI) components.

12. The device of claim 7, wherein creating a pool of at least one empty application further comprises:
monitoring the device for an idle state;
determining that the device is in the idle state; and
responsive to determining that the device is in the idle state, creating at least one empty application.

13. The device of claim 12, wherein monitoring the device for an idle state further comprises:
starting a timer;
detecting user input associated with the device;
responsive to detecting user input, resetting the timer; and
determining that the device is in the idle state when the timer expires.

14. A computer-implemented method comprising:
monitoring a device for an idle state, wherein monitoring the device for an idle state comprises monitoring Central Processing Unit (CPU) usage associated with the device;
determining that the device is in the idle state;
responsive to determining that the device is in the idle state, creating at least one empty application; and
responsive to selection of a specific-type application, loading an assembly associated with the selected specific-type application into an empty application of the at least one empty application,
wherein each empty application of the at least one empty application is configured as a placeholder for a specific-type application, and further configured to include resources that are common across one or more specific-type applications, and
wherein creating the at least one empty application comprises initializing the resources that are common across the one or more specific-type applications for the one of the one or more specific-type applications effective to reduce startup time of said one of the one or more specific-type applications.

15. The computer-implemented method of claim 14, wherein the resources that are common across the one or more specific-type applications include user interface (UI) components.

16. The computer-implemented method of claim 14, wherein monitoring a device for an idle state further comprises:
setting a timer for a predetermined expiration time;
monitoring the device for inputs;
responsive to detecting an input on the device within the predetermined expiration time, resetting the expiration time; and
responsive to detecting the timer has expired, signaling a notification of lack of input to at least one software module.

17. The computer-implemented method of claim 16, wherein signaling a notification comprises sending a broadcast message to the at least one software module.

18. The computer-implemented method of claim 17, wherein the at least one software module is a software module that has subscribed to receive the broadcast message.

19. The computer-implemented method of claim 14, wherein the pool of at least one empty application comprises at least two empty applications and each empty application includes instances of resources that are the same resources.

20. The computer-implemented method of claim 14, further comprising responsive to determining that the device is in the idle state, at least partially launching a specific-type application identified as being used more than other specific-type applications.

* * * * *